INVENTOR
WILLIAM P. GARDINER

United States Patent Office 3,402,376
Patented Sept. 17, 1968

3,402,376
SWITCH WITH MAGNETICALLY CONTROLLED INNER ROTATING AND RECIPROCATING ELEMENT
William P. Gardiner, 4822 36th St.,
Columbus, Nebr. 68601
Filed Nov. 15, 1965, Ser. No. 507,966
2 Claims. (Cl. 335—207)

ABSTRACT OF THE DISCLOSURE

As thus described it will be seen that movements of the outer element 100 in the directions of the arrows 52 and 50 between alternate positions in which the north pole of the outer element or magnet 100 is slightly to the left or slightly to the right of the north pole of the inner magnet or inner element 12, and not closer to the inner element south pole than to the inner element north pole, as will cause the inner element 12 to move to the right or left respectively because of a repulsion in which the north and south poles of the outer element repulse the north and south poles of the inner element respectively with greater total force than the total attractive force of the north and south poles of the outer element for the south and north poles of the inner element, the said total attractive force being lesser because of greater distance between the poles which attract each other than there is distance between the poles that repel each other.

---

Movement of the inner element to the right will cause protrusions 114 and 116 to make contact with the contact element means 30 and 32 and movement of the inner element to the left will cause the element 12 to move in the direction of the arrow 52 until such time as a nonmagnetic member 300 has pressed an element 312 into engagement with the inner side 316 of the closure 46.

The elements 300 and 312 would only be used in a rotative switch and if they are not used the inner side of the end wall 16 can be moved up to the position of the dotted line 316'.

It will be seen that the element 312 is a bar magnet having a pole 316" at one of its ends and an opposite pole 320 at the other of its ends.

In FIGURE 1 it will be seen that a connector housing 340 is provided which has a main portion 350 of cylindrical shape and has an end portion 354.

The connector housing 340 is disposed in a position interconnecting magnet units 360 and 362 forming parts of the externally driving element 100 when separate units on opposite sides of the axis 80 are desired instead of a doughnut shaped single magnet 100.

The connector housing 340 also interconnects a pair of bar magnets, on rotation control driving permanent magnets, 390 which are disposed on opposite sides of the tube 40, each of the magnets 390 having an inner end pole 400 of opposite polarity to the adjacent pole 316 or 320 of the inner rotational or slave element or bar magnet 312.

The outer magnets 390, either one of which can be called a second outer magnetic element 390, and either of which has a pole 400 adjacent and attracted to one of the poles 316" or 320 of the second inner permanent magnet 312.

As thus described when the control housing 340 is rotated the magnets 390 will be rotated causing rotation in an identical direction by the inner rotational control slave magnet 312. As best seen in FIGURE 4 in addition to the contact means 30 which is on the axis 80 and the contact means 32 which is spaced from the axis 30 there are other contact means 410, 412 and 414 which are disposed equi-distantly from the axis 80 and at the same distance from the contact 30 as the contact means 32, whereby the protrusion 414 can connect the contact means 30 electrically with any one of the contact means 32, 410, 412 and 414 in accord with the position of the protrusion 116 as rotatably controlled by the control housing 340.

The manner of achieving much lesser friction in the switch of this invention will now be described. First of all it will be understood that the switch can be used as a simple switch, rather than a selector switch, by the elimination therefrom of the magnets 312 and 390. And so with this in mind, it will be seen that the inner element 12 is cylindrical, and is concentrically disposed about the axis 80 in the cylindrical inner wall 82 of the frame 20, the frame 20 being identified as all or part of the cylindrical tube or enclosure 40.

The inner element 12 is arranged in a position approximately centrally between any two opposite sides of the frame 20 with the inner element 12 having a north pole 280 facing toward one direction of sliding motion of the inner element 12 and having a south pole 270 facing in the opposite direction of motion thereof.

The outer element 100 is disposed with two north pole portions or north poles 260 disposed on opposite sides of and repelling the north pole or north pole portion 280 of the inner element 12, and disposed closer to the north pole portion 280 of the inner element 12, than to the south pole 270 of the inner element 12 during travel of the elements for switch opening and closing. For this reason the inner element 12 tends to be repulsed away from frictional engagement with each of any two opposite sides of the frame 20 during travel of the inner element 12 whereby the inner element or inner magnet 12 tends to float and move between opposite walls substantially without touching or frictional engagement with the opposite walls as provides an exceedingly dependable switch.

This is because an element disposed between two opposite magnetic repelling forces tends to seek a position of balance between the two forces and as the opposite sides of the outer magnet 100 are in positions for equal repulsion, the inner element 12 tends to float or move back and forth without substantially frictionally engaging the walls of the frame 20.

As thus described the application is believed to fullfil the objectives above set forth in providing an externally controlled magnetic switch that is relatively frictionless because of balancing opposed magnetic repulsion and which is adapted for multiple contact selection by rotational control.

From the foregoing description, it is thought to be obvious that a magnetic switch assembly constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

Figure 1:
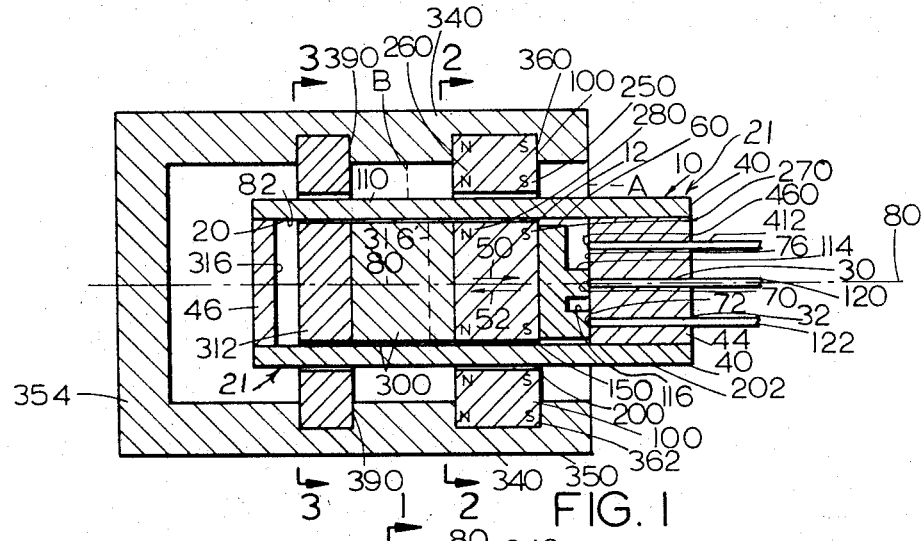
FIGURE 1 is a side view of the switch of this invention with its forward half removed so as to show the parts in section.
Figure 2:
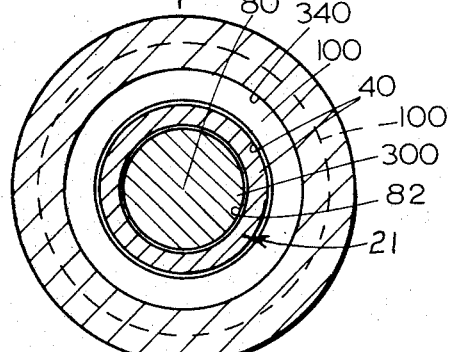
FIGURE 2 is a sectional view taken along the line 2—2 of FIGURE 1.
Figure 3:
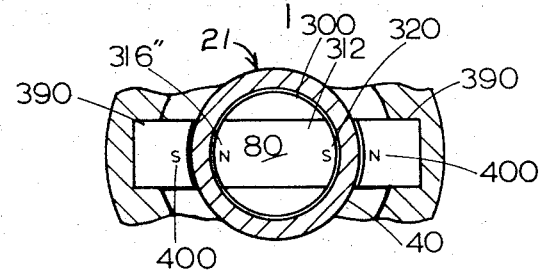
FIGURE 3 is a sectional view taken along the line 3—3 of FIGURE 2, but with the parts rotated 90 degrees to illustrate the rotary switching motion.
Figure 4:
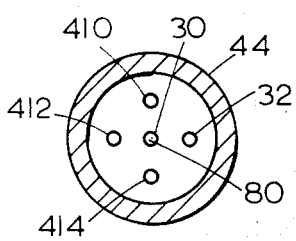
FIGURE 4 is a sectional view taken along the line 2—2 of FIGURE 1, but with the central moving portion of the switch removed and not showing motion control parts disposed outwardly of a sealed enclosure of the switch, the view showing multiple contacts.

The magnetic switch of this invention is generally indicated at 10 in FIGURE 1, and comprises an inner element or inner magnet 12, which can also be called an inner slave element 12, the element 12 being of permanent magnetic material.

An electrically conductive member or means 60 is disposed between the inner slave element 12 and the contact means 30 and 32 and the conductive means 60 is mounted on and connected to that side of the inner slave element 12 which is adjacent inner ends 70 and 72 of the conductors 30 and 32, which can also be called stationary contacts 70 and 72, the inner ends 70 and 72 being disposed flush with a planar inside side 76 of the end closure 44, the inner side 76 being disposed at a right angle to the axis 80 of the cylindrical tube 40.

It will be seen that the frame 20 and sealing means 44 can also be together referred to as a mounting means 21 for the stationary contacts 70, 72.

An electrical selector switch having a first set of contacts mounted on a driven magnet, a second set of contacts with respect to which the contact carrying magnet reciprocates and rotates, and a rotation control driven magnetic means attached to said contact carrying magnet and reciprocating and rotating therewith, and rotation control driving magnetic means for causing selective rotation of said rotation control driven magnetic means and of said first set of contacts.

The switch further has a frame 20, and two contact means 30 and 32 disposed adjacent and spaced from each other. The frame 20 can be identified as all or part of a cylindrical tube or enclosure 40 which has first and second end sealing means 44 and 46 at each of its ends respectively, the end sealing means each being preferably magnetically non-attractive, non-ferrite and the end sealing means 44 in addition being electrically insulating.

The end sealing means 44 provides a means mounting the contact means 30 and 32 in the frame 20.

Inner element mounting means is provided mounting the inner or slave element 12 on the frame 20 in a manner for movement in each of two opposite directions 50 and 52 toward and away from the two contact means 30 and 32, such inner element mounting means comprising, in a sense, portions of the tube 40.

The tube 40 has a cylindrical inner wall 82, which is symmetrical about the axis 80.

An external drive element, or external magnet, or drive element, or closing control driving magnetic means 100 is spaced from the inner magnet or inner element 12, the spacing being close enough for a magnetic repulsion to take place as later described.

The outer element 100 could be an electro-magnet.

An enclosure means 110 surrounds the inner element 12 and the conductive means 108 and the enclosure means 110 can be formed of the tube 40 and the end closures 44 and 46.

The inner ends 70 and 72 of the contact means 30 and 32 are exposed and are disposed in portions for engagement by projecting portions or moving contacts 114 and 116 of the electrically conductive means 60.

The contact means 30 and 32 are connected to two conductors 120 and 122 which can lead to circuits, not shown. The contact means 30 and 32 can be said to have portions extending through the enclosure means 110 because they extend through the end member 44 thereof.

The external element 100 is movable in the directions 50 and 52 for causing movement of the inner slave element 12 at different times in each of the two opposite directions 50 and 52.

The inner slave element 12 preferably has a cylindrical outer surface 150 in close sliding contact with the inner wall 82 and the outer or driver element 100 is preferably in the form of an annular shape somewhat like a doughnut and provided with a cylindrical inner wall 200 in close slidable contact with the inner wall 202 of the tube 40.

Although the switch of FIGURE 1 will be later described as being useful as a rotative or selector switch, yet it can be used for simply making contact between only two contacts 30 and 32.

The external driving element 100 is preferably a magnet having a first pole 250 nearest the contact means 30 and 32 and a second and opposite pole 260 farther from the contact means 30 and 32. The inner element 12 is preferably a magnet having a first pole 270 of like charge to the first pole 250 of the external element 100 and the first pole 270 of the inner element is disposed on the side of the inner element 12 nearest the contact means 30 and 32.

The inner element 12 has a second pole 280 of opposite charge to the inner element first pole 270 and disposed on a side of the element 12 farthest from the contact elements 30 and 32.

It will be seen that the element 312 can be called a second inner permanent magnet or it can be called a rotation control driven permanent magnet 312.

It should be explained that the element 300 is connected to that side of the slave inner element 12 which is opposite from the contact members 30 and 32 and that the element 312 is disposed on the opposite side of the member 300 from the magnet 12.

The element 312 can also be called a second inner permanent magnet 300 and has its poles 316″ and 320 disposed with respect to each other along a line transverse to the opposite directions of movement of the inner magnet 12.

I claim:

1. A magnetic switch comprising: an inner element of permanent magnetic material, a hollow non-magnetically attractable frame having at least two opposite inner sides, stationary contact means, means mounting said stationary contact means in said frame, means mounting said inner element in said frame in a manner for movement in each of two opposite directions toward and away respectively from said stationary contact means, a moving contact means in said frame, means connecting said inner element to said moving contact, and an external magnetic element on the outer side of said frame, said external element being actuatable in each of two ways for causing respective movements of said inner element in each of said two opposite directions, said inner element when caused to move in one of said directions pressing said moving contact against said stationary contact means, said inner element being arranged in a position approximately centrally between said two opposite sides of said frame, the said outer element having first and second parts disposed on opposite sides of said inner element and urging said inner element toward said two opposite sides of said frame respectively during traveling of said elements with respect to each other for switch opening and closing to reduce friction, said first and second parts of said outer element being mechanically interconnected for at all times urging said inner element in a same direction, and in which said stationary contact means are multiple separate contacts and said inner element and said moving contact means are rotatable with respect to said frame, and said moving contact means being operatively correlated with said stationary contacts whereby different rotative positions of said inner element and said moving contact means will make selective contact with different ones of said stationary contacts, a second inner permanent magnet having poles disposed with respect to each other along a line transverse to the said two opposite directions of movement of said inner element, a second outer magnetic element having a pole adjacent and attracted to one of the poles of said second inner permanent magnet, said second inner permanent magnet being connected to and rotatable with said inner element, said second outer magnetic element being connected to and rotating with said outer element, said external element and said second outer magnetic element being rotatable together about said frame in a manner for causing the rotation of said inner element.

2. A magnetic switch comprising: a closing control driven magnetic means 12 of permanent magnetic material, stationary contact means 70, 72, mounting means 21, 20, 44 for said stationary contact means 70, 72, a moving contact means 114, 116 movable with respect to said mounting means 21, 20, 44, means conecting said closing driven means 12 to said moving contact means 114, 116, and a closing control driving magnetic means 100, said mounting means 21 supporting said driving closing means 100 in a manner operatively correlated with respect to said driven closing means 12 whereby said driving closing means 100 is actuable in each of two ways causing movements of said driven magnetic means in each of two opposite directions 50, 52 toward and away respectively from said stationary contact means 70, 72, said driven closing means 12 when caused to move in one of said directions 50, 52 pressing said moving contact means 114, 116 against said stationary contact means 70, 72, said mounting means 21, 20, 44 limiting movement of said driven closing means 12 in a direction away from said stationary contact means 70, 72, one of said closing control magnetic means 12, 100 having first and second parts disposed on opposite sides of the other of said closing means 12 or 100 during traveling of said driven closing means 12 for switch opening and closing, said first and second parts being mechanically interconected for at all times urging said driven closing means 12 in a same direction, the other of said closing means 12, 100 being arranged in a position approximately centrally between the said parts of said one closing means 12 or 100, said driving and driven closing means 100, 12 having like poles 250, 270 at the corresponding ends thereof causing the repulsion of said driven closing means 12 from each of said two opposite sides thereof to cause said driven closing means 12 to move with lesser friction, and in which said stationary contact means is multiple separate contacts 70, 72 and in which said moving contact means is multiple separate contacts 114, 116, and in which said driven closing control magnetic means 12 is is rotatable about an axis 180, the path of movement of said driven magnetic means 12 when it moves in said two opposite directions 50, 52 being parallel to said axis 180, and said moving contacts 114, 116 being operatively correlated with said stationary contacts 70, 72 whereby different rotative positions of said driven closing means 12 and of said moving contact means 114, 116 with respect to said stationary contacts 114, 116 with respect to said stationary contacts 70, 72 will cause selective contact upon switch closing with different ones of said stationary contacts 70, 72, a rotation control driven permanent magnetic means 312 having poles 316″, 320 disposed with respect to each other along a line transverse to said two opposite directions 50, 52 of movement, a rotation control driving magnetic means 390 having a pole adjacent and attracted to one of the poles of said rotation control driven magnetic means 312 whereby rotation of said rotation control driving means 390 will cause rotation of said rotation control driven means 312, said rotation control driven means 312 being connected to and rotatable with said closing control driven means 12, said rotation control driving means 390 being connected to and rotating with said closing control driving means 100, said closing control driving means 100 and said rotation control driving means 390 being rotatable together about said axis in a manner for causing the rotation of said closing control magnetic means 12, and said contacts being so arranged that rotation of said rotation control driven means 312 into different positions will result in selective contact engagement upon closing.

References Cited
UNITED STATES PATENTS

| | | | |
|---|---|---|---|
| 3,243,238 | 3/1966 | Lyman | 308—10 |
| 3,273,091 | 9/1966 | Wales | 335—207 |
| 2,895,027 | 7/1959 | Ball | 200—87 |
| 3,016,434 | 1/1962 | Seeger | 200—87 |
| 3,025,372 | 3/1962 | Benson | 200—67 |
| 3,260,821 | 7/1966 | Yokoo | 200—87 |

FOREIGN PATENTS 141,000   12/1962   Germany.

BERNARD A. GILHEANY, *Primary Examiner.*

R. N. ENVALL, JR., *Assistant Examiner.*